United States Patent [19]

Klepesch

[11] Patent Number: 4,531,887
[45] Date of Patent: Jul. 30, 1985

[54] CONTINUOUS BLADE MULTI-STAGE PUMP

[76] Inventor: Philip H. Klepesch, 5859 Sagebrush Rd., La Jolla, Calif. 92037

[21] Appl. No.: 501,362

[22] Filed: Jun. 6, 1983

[51] Int. Cl.³ .............................................. F01D 5/06
[52] U.S. Cl. .................... 415/90; 415/199.4; 416/188
[58] Field of Search .............. 415/76, 77, 90, DIG. 4, 415/199.1, 199.4, 199.5, 198.1, 66, 68; 416/179, 188, 4

[56] References Cited

U.S. PATENT DOCUMENTS

| | | | |
|---|---|---|---|
| 940,103 | 11/1909 | Feld | 415/90 X |
| 1,056,338 | 3/1913 | Johnsen | 415/90 |
| 2,030,560 | 2/1936 | Adams, Jr. | 415/76 X |
| 2,087,834 | 7/1937 | Brown et al. | 415/90 X |
| 2,998,099 | 8/1961 | Hollingsworth | 415/90 X |

FOREIGN PATENT DOCUMENTS

| | | | |
|---|---|---|---|
| 1383811 | 2/1975 | United Kingdom | 415/DIG. 4 |
| 729382 | 5/1980 | U.S.S.R. | 415/199.5 |

*Primary Examiner*—Robert E. Garrett
*Assistant Examiner*—Joseph M. Pitko
*Attorney, Agent, or Firm*—Baker, Maxham, Callan & Jester

[57] ABSTRACT

A multi-stage axial flow pump includes multiple axial positioned impellers formed of multiple nestled smooth continuous surface blades having a generally truncated spheroid configuration defining a plurality of axially elongated annular channels between the blades that induce fluid flow by means of frictional drag on the fluid.

9 Claims, 3 Drawing Figures

U.S. Patent   Jul. 30, 1985   4,531,887
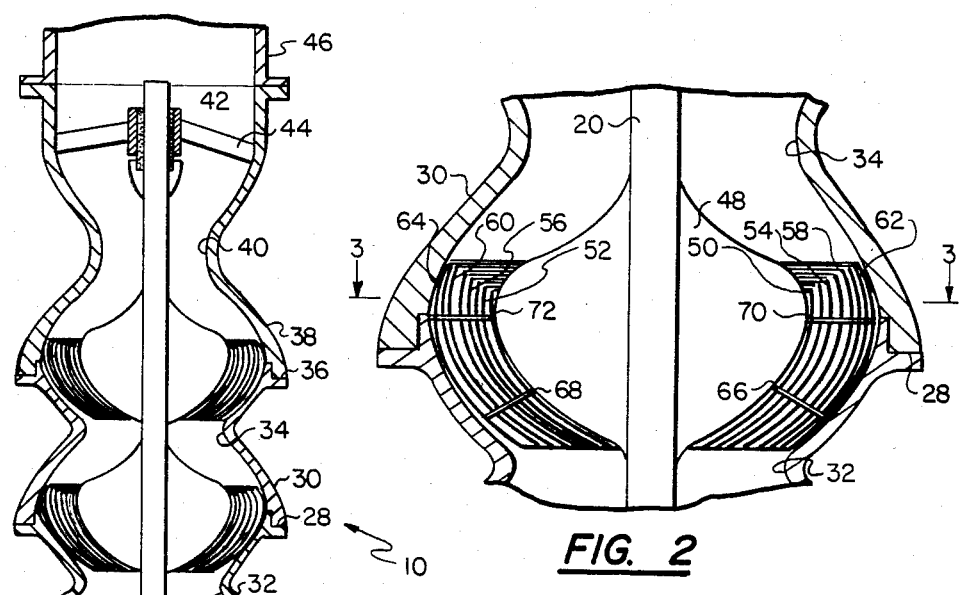
FIG. 1
FIG. 2
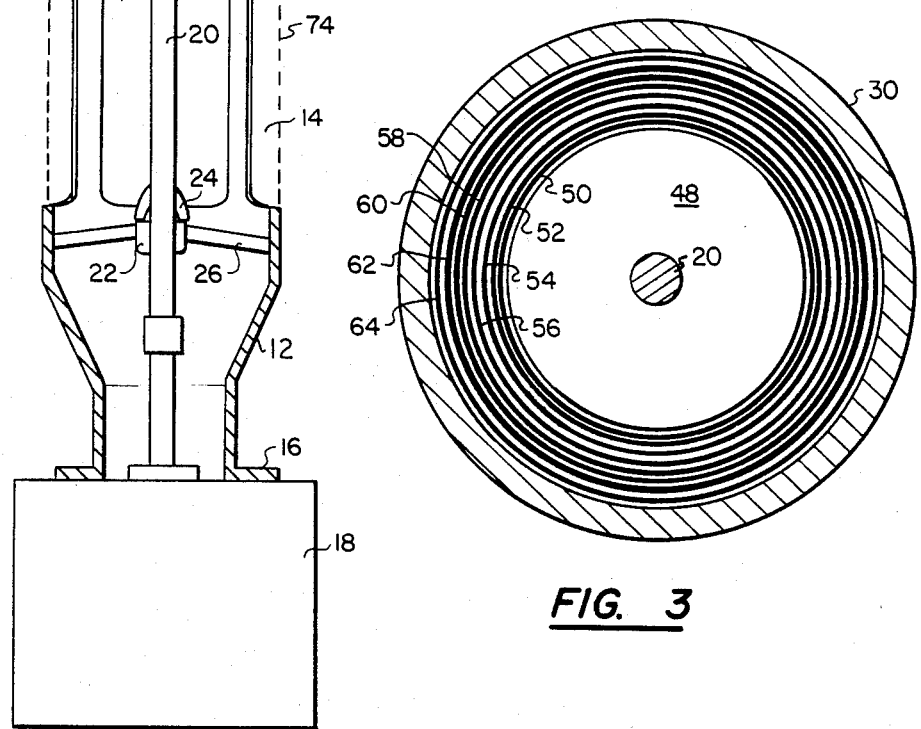
FIG. 3

CONTINUOUS BLADE MULTI-STAGE PUMP

BACKGROUND OF THE INVENTION

The present invention relates generally to pumps and pertains particularly to an improved continuous surface frictional drag pump.

Rotary disc pumps having smooth surfaces that impose an impelling force on a fluid by means of frictional or boundary layer drag on the fluid were initially proposed by Nicholas Tesla around 1913. Such pumps, however, have been of very little interest, however, due to the lack of efficiency as compared to traditional bladed impeller pumps.

Such pumps which operate on the principle of boundary layer drag have been of interest and proposed for use with certain specific fluids such as human blood. Such application, however, requires low pressure and low force on the fluid.

Pumps operating on this principle, however, are of interest in other applications due to the lack of impediment to the passage of solid particles through the pump. The problem of sufficiently high pressures and efficiencies have, however, continue to be a problem.

It is therefore desirable that an improved continuous blade multi-stage pump be available.

SUMMARY AND OBJECTS OF THE INVENTION

It is therefore the primary object of the present invention to provide an improved boundary layer drag pump.

In accordance with the primary aspect of the present invention a boundary layer drag pump which imposes an impelling force on a fluid by means of frictional or boundary layer drag on the fluid includes an impeller rotatably mounted within a housing chamber and including means for defining an axially elongated annular channel along the rotor with an inlet at one end thereof and an outlet at the other with the annular channel increasing from a minimum diameter at the inlet to a maximum diameter intermediate the ends thereof and reducing again from the maximum diameter to an intermediate diameter at the outlet.

BRIEF DESCRIPTION OF THE DRAWINGS

The above and other objects and advantages of the present invention will become apparent from the following description when read in conjunction with the drawings wherein:

FIG. 1 is a side elevation view partially in section showing a preferred embodiment of the invention;

FIG. 2 is an enlarged detail view of one stage of the embodiment of FIG. 1; and

FIG. 3 is a section view taken on line 3—3 of FIG. 2.

DETAILED DESCRIPTION OF THE PREFERRED EMBODIMENT

Referring to the drawings, a pump in accordance with the invention is illustrated in FIG. 1 and designated generally by the numeral 10. The illustrated pump is designed as a multi-stage axial flow pump having an elongated multiple part housing. The housing includes a lower generally elongated tubular section 12 having radial inlet ports or openings 14 intermediate the ends. A screen 74 covers the inlet ports or openings. The lower end of the housing includes a flange portion 16 for connection to an electric or other motor 18 for driving the pump. An impeller or rotor shaft 20 is rotatably journaled in a bearing 22 having the usual bearing seal 24. The bearing 22 is supported in a lower bearing support structure 26 of the housing 12.

The housing includes an upper end with an annular flange 28 for cooperative engagement and connection to a first stage impeller housing portion 30 for defining a somewhat spheroidal chamber having a reduced inlet section 32 and a reduced outlet section 34. A second stage chamber is formed by the upper outward flared portion of housing 30 which flares outward to a flange section 36 for attachment to the lower end of an upper housing portion 38 which includes a reduced outlet passage portion 40. The upper housing section 38 includes a journal bearing 42 supported on radial support members 44 for supporting the upper end of the impeller shaft 20. The upper end of the housing 38 opens into a cylindrical pipe or conduit 46 for carrying the pressurized fluid to a desired location.

The impeller of the present pump includes a plurality of continuous substantially smooth surface blades or shells having a generally truncated oblate spheroid configuration nestled together for defining a plurality of axially elongated annular passages extending along the axis of the rotor. These passages are defined by the opposed surfaces of the nestled shells and have an inlet of a first diameter with the passage gradually increasing axially from the inlet end to a maximum diameter intermediate the ends and gradually decreasing from the maximum diameter down to an intermediate diameter at the outlet. The outlet diameter is intermediate that of the maximum diameter and the inlet diameter.

More specifically as shown in FIG. 2, each of the impellers includes a central irregular spheroid 48 mounted on the rotor shaft 20 for rotation therewith. The central nodule 48 supports a plurality of shell-like blades 52 through 64. These shells 52 through 64 have a generally truncated oblate spheroid configuration beginning with the first blade 50 closely spaced from the central nodule 48 and becoming progresively larger outward to the outermost largest shell 64 which is closely spaced inward from the inner surface of the housing. These shells are preferably supported from the central nodule 48 by means of a plurality of small radial pins or arms 66, 68, 70 and 72. These provide support of the shell blades yet present a minor surface to the passage of fluid and/or solid particles along the flow channels of the impeller.

The second stage and any subsequent stage is identical to the first stage with the outlet from the previous stage feeding into the inlet to the subsequent stage. This staging concept or structure can develop a highly efficient high-lift system that greatly increases the lift and pressure developed on a friction impeller-type system.

The system works on the so called friction or boundary layer principle in that the friction (or molecular attraction) between the surfaces of the blades and the layer of fluid adjacent the blade operates to drag the fluid along with the blade. As the blade rotates, it pulls the fluid along with the fluid rotating with the blade and channeled radially outward under the influence of centrifugal force, forcing the fluid rapidly outward to the maximum diameter of the fluid passage or channels of the rotor with the fluid continuing to move under high velocity (pressure) out the outlet end of the impeller into the inlet of the next stage. Thus the combination of the friction or boundary layer drag and the centrifugal force propels the fluid along from the inlet to the outlet of each stage of the pump. The blades are each of a shell-like construction as previously explained with the inner and outer surfaces being substantially smooth with no external or extending blade structure.

The blades or shells can be spaced at substantially any desired distance apart. It will be apparent, however, that the minimum space and maximum number of blades with maximum surface imposes the greatest amount of force on the fluid. Therefore, with greater space between the blades with a given fluid the force on the blade or on the fluid by means of the blade will be substantially less. The viscosity of the fluid is also a factor that will determine the pressure and efficiency of the pump with that particular fluid.

The pump is primarily designed and is most efficient with liquids, however, it should be understood that it can also be utilized for the pumping of gases.

As previously explained, the fluid is propelled along by means of force from the rotational drag or friction action of the blades. Another velocity vector or factor is that from centrifugal force as the fluid is forced outward from the base of the blades and directed upward by the directional surfaces of the blades. Since the surface velocity of the blade increases as it angles away from the shaft, it also transmits this velocity change to the fluid. The inward curved top of the blade brings fluid smoothly back in line with the discharge channel and the inlet port to the next stage.

The number of stages and the thickness, height and curvature of the blades as well as the spaces, rotational speed, etc. are to be considered as functions of the viscosity of the fluid, the head required, and the flow rate required.

The pump can be utilized in any substantial or typical configuration such as a submersible pump or inline configuration.

While I have illustrated and described my invention by means of specific embodiments, it is to be understood that numerous changes and modifications made be made therein without departing from the spirit and scope of the invention as defined in the appended claims.

I claim:
1. An axial flow pump, said pump comprising:
a housing defining a rotor chamber having an axis;
an inlet at one axial end of said chamber and an outlet at the other axial end of said chamber;
and a first impeller coaxially rotatably mounted in said chamber and comprising elongated annular shell means defining an axially extending continuous annular flow channel defined by continuous opposed walls of said shell means and said shell means having a first inlet diameter and continuously gradually increasing in diameter with increasing distance from said inlet to a position of maximum diameter axially along said rotor toward said outlet and continuously gradually decreasing in diameter with increasing distance from said maximum diameter position to an outlet diameter that is intermediate said inlet and maximum diameter so that said shell means curves inwardly toward the axis for directing fluid inward toward the axis thereof.

2. The axial flow pump of claim 1 including a second impeller axially displaced from said first impeller.

3. The axial flow pump of claim 1 wherein said first impeller includes a plurality of said flow channels spaced radially outward on said rotor.

4. The axial flow pump of claim 3 wherein said multiple channels are defined by a plurality of continuous substantially smooth surface shells having a generally truncated spheroid configuration.

5. The axial flow pump of claim 4 wherein said shells have an oblate spheroid configuration.

6. The axial flow pump of claim 5 including a second impeller identical to said first impeller.

7. An axial flow pump comprising:
a housing defining a generally spheroid rotor chamber having an axis;
an inlet at one end of said chamber and an outlet at the other end of said chamber; and
a first impeller rotatably mounted in said chamber and comprising a plurality of concentrically mounted radially spaced shells of a truncated generally oblate spheroid configuration mounted for rotation about the axis thereof defining fluid flow channels spaced therebetween having a generally spheroid configuration with an inlet at one end and an outlet at the other end, said shells curving inward toward the axis thereof at the outlet for directing fluid inward toward the axis thereof.

8. The axial flow pump of claim 7 wherein the surfaces of said shells are continuous and substantially smooth.

9. The axial flow pump of claim 8 including a second impeller axially displaced from said first impeller.

* * * * *